(12) United States Patent
Bhattacharjya

(10) Patent No.: US 7,330,191 B2
(45) Date of Patent: Feb. 12, 2008

(54) SYSTEM FOR SECURE TEXT DISPLAY

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 11/039,441

(22) Filed: Jan. 19, 2005

(65) Prior Publication Data
US 2006/0158464 A1 Jul. 20, 2006

(51) Int. Cl.
*G09G 5/02* (2006.01)
*G06K 15/00* (2006.01)
*G06K 9/42* (2006.01)
*G06K 9/44* (2006.01)
*H04N 1/405* (2006.01)

(52) U.S. Cl. ............... 345/592; 358/3.13; 358/3.14; 358/3.15; 358/3.16; 358/3.17; 358/3.18; 382/257

(58) Field of Classification Search ........ 345/592–596; 382/169, 257; 358/3.13–3.18
See application file for complete search history.

(56) References Cited

U.S. PATENT DOCUMENTS

| | | | | |
|---|---|---|---|---|
| 4,626,901 A | * | 12/1986 | Tanioka | 358/535 |
| 5,438,634 A | * | 8/1995 | Kumagai | 382/169 |
| 5,526,445 A | * | 6/1996 | Smutek et al. | 382/237 |
| 5,714,974 A | * | 2/1998 | Liu | 345/694 |
| 5,714,975 A | * | 2/1998 | Spackman | 345/596 |
| 5,828,463 A | * | 10/1998 | Delabastita | 358/3.17 |
| 5,986,771 A | | 11/1999 | Henderson et al. | |
| 6,064,359 A | * | 5/2000 | Lin et al. | 345/89 |
| 6,101,002 A | * | 8/2000 | Urasawa | 358/3.13 |
| 6,189,934 B1 | | 2/2001 | Scruggs | |
| 6,608,702 B1 | * | 8/2003 | Urasawa | 358/3.2 |
| 6,680,786 B1 | * | 1/2004 | Sato et al. | 358/3.18 |
| 6,864,996 B1 | * | 3/2005 | Fujita | 358/3.13 |
| 7,027,660 B2 | * | 4/2006 | Hersch et al. | 382/257 |
| 2003/0021437 A1 | * | 1/2003 | Hersch et al. | 382/100 |
| 2003/0179412 A1 | | 9/2003 | Matsunoshita | |

OTHER PUBLICATIONS

V. Ostromoukhov, R.D. Hersch, I. Amidror, "Rotated Dispersed Dither: A New Technique for Digital Halftoning", Proc. Of SIGGRAPH '94 in Computer Graphics, 19994, pp. 123-130.*
V. Ostromoukhov, R. D. Hersch, "Halftoning by Rotating Non-Bayer Dispersed Dither Array", IS&T/SPIE 1995, Feb. 4-10, 1995, San Jose, CA, Proc. Conf. Human Vision, Visual Processing and Digital Display, VI, SPIE vol. 2411, pp. 1-20.*

* cited by examiner

*Primary Examiner*—Jin-Cheng Wang

(57) ABSTRACT

Techniques for securely displaying text on a display panel involve destroying spatial and temporal correlations in an otherwise uniform visual field. The techniques render the displayed text secure with respect to attempts to copy the text using a video capture device or still-picture camera. The techniques also render the displayed text unreadable to casual over-the-shoulder viewing by strangers outside of a certain narrow reading area.

8 Claims, 7 Drawing Sheets

SYSTEM FOR SECURE TEXT DISPLAY

BACKGROUND OF THE INVENTION

1. Field of the Invention

The present invention relates to techniques for displaying text securely (i.e., such that the displayed information cannot be copied by taking pictures of the display using a still or video camera). The techniques of the invention can be applied to display panels, such as hand-held and cell-phone displays, monitors, etc., which employ LCD panels, CRT screens or other display technologies that have a sufficiently high refresh rate.

2. Description of the Related Art

Hand-held devices with displays and laptops have become quite popular and in fact are now ubiquitous. Their popularity is due in part to the ease of which these devices can be deployed nearly anywhere including in public places. Viewing the display of such a device in a public place, particularly a crowded one, is not without risk, however, particularly if the information being viewed is confidential or private. The danger is that a stranger nearby may be able to view or copy information on the display. Prevention of such intrusive action is clearly desirable.

OBJECTS OF THE INVENTION

Accordingly, it is an object of the present invention to provide a technique for displaying text securely on a display panel, particularly a display panel for a hand-held device or laptop computer.

In providing a secure text display, it is another object of this invention to prevent the use of a still or video camera from copying information displayed on the display.

In providing a secure text display, it is a further object of this invention to prevent casual over-the-shoulder viewing of the display by another person outside of a viewing range.

SUMMARY OF THE INVENTION

According to one aspect, this invention provides method for securely rendering text on a display, such as the display of a hand-held device. In one embodiment, the method comprises rendering both a foreground region and a background region of a frame using a selected grayscale level, each of the foreground and background regions comprising a plurality of pixels. A first orbit is selected for the foreground region and a second orbit is selected for the background region. A dither matrix is circularly shifted by a first displacement determined by the first orbit relative to the foreground region and circularly shifted by a second displacement determined by the second orbit relative to the background region. The method further includes comparing a threshold, defined by a corresponding element of the dither matrix, at each pixel location in the frame with the selected grayscale level to compute the output value for that pixel.

Preferably, the first and second orbits have the same number of elements and have opposite senses of rotation.

Preferably, the first displacement is given by the $(F \% N)^{th}$ element of the first orbit, and the second displacement is given by the $(F \% N)^{th}$ element of the second orbit.

In another embodiment, the method for securely rendering text on a display comprises rendering both a foreground region and a background region of a frame using a selected grayscale level, each of the foreground and background regions comprising a plurality of pixels; partitioning the ranks of a dither matrix into N equal-sized bins, N denoting the frame period; selecting an index n for the frame, setting all elements in the $n^{th}$ bin of the dither matrix to the foreground color value, and setting the remaining elements of the dither matrix to the background color value; and comparing a threshold, defined by a corresponding element of the dither matrix, at each pixel location in the frame with the selected grayscale level to compute the output value for that pixel.

In another aspect, the invention involves a display device, which may be a hand-held device or laptop computer. The device comprises processing circuitry configured to render both a foreground region and a background region of a frame using a selected grayscale level, each of the foreground and background regions comprising a plurality of pixels, and destroy spatial and temporal correlations in a visual rendering of text in the foreground region using a dither matrix. The device further comprises a display on which the frame is rendered.

In one embodiment, the processing circuitry is further configured to select a first orbit for the foreground region and a second orbit for the background region, circularly shift the dither matrix by a first displacement determined by the first orbit relative to the foreground region, circularly shift the dither matrix by a second displacement determined by the second orbit relative to the background region, and compare a threshold, defined by a corresponding element of the dither matrix, at each pixel location in the frame with the selected grayscale level to compute the output value for that pixel.

In another embodiment, the processing circuitry is further configured to partition the ranks of the dither matrix into N equal-sized bins, N denoting the frame period, select an index n for the frame, setting all elements in the $n^{th}$ bin of the dither matrix to the foreground color value, and setting the remaining elements of the dither matrix to the background color value, and compare a threshold, defined by a corresponding element of the dither matrix, at each pixel location in the frame with the selected grayscale level to compute the output value for that pixel.

The processing circuitry may include at least one of a mobile graphics engine, a display controller, or a microprocessor unit. In the case of inclusion of a mobile graphics engine, such engine includes a pixel processor.

In accordance with further aspects of the invention, either of the above-described methods or any step thereof may be performed in response to execution of a program of instructions (e.g., software) by a computer, or other device capable of executing program instructions. Alternatively, the program of instructions may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The techniques of the present invention enable the secure display of text on any display that has a sufficient refresh rate, e.g., any display that is refreshed at a rate of at least 10 frames per second. The term "secure" as used in this context that the information on the display cannot be copied by taking a picture of the display using a still or video camera. The technique is also resistant to casual "over-the-shoulder" viewing of the display by others positioned outside of a small viewing range.

The techniques of this invention exploit human ability to detect spatial and temporal correlations in an otherwise uniform visual field. Averaging the visual field (even over as few as two frames) over time or looking at a single frame destroys these correlations, rendering the displayed information unreadable. Since the refresh rate of the display is not synchronized with that of a casually pointed video-capture device, the spatio-temporal averaging of the displayed field gives rise to averaging loss coupled with spatial and temporal Moiré affects that destroys the displayed information.

Two embodiments of the secure-text-display technique are described. In the first embodiment, foreground and background pixels are changed at the same rate. In the second embodiment, the foreground and background pixels are changed at different rates. A combination of the first and second embodiments may also be used. For example, the foreground and background pixels could be changed at the same rate for one or more specified time periods and changed at different rates the remainder of the time. Changing at the same or different rates can also be alternated according to a specified pattern.

In the following discussion, the input frame is considered to be a binary representation with foreground (text) and background pixels. A pre-processing step of converting a non-binary frame into a binary frame may be employed, as shown, in the flow chart of FIG. 1, if necessary. Both embodiments make use of a dither matrix to create a random visual field, and build spatio-temporal correlations by choosing thresholds and shifted elements from the dither matrix.

Using the Same Update Rate for Background and Foreground Pixels

Figure 2:
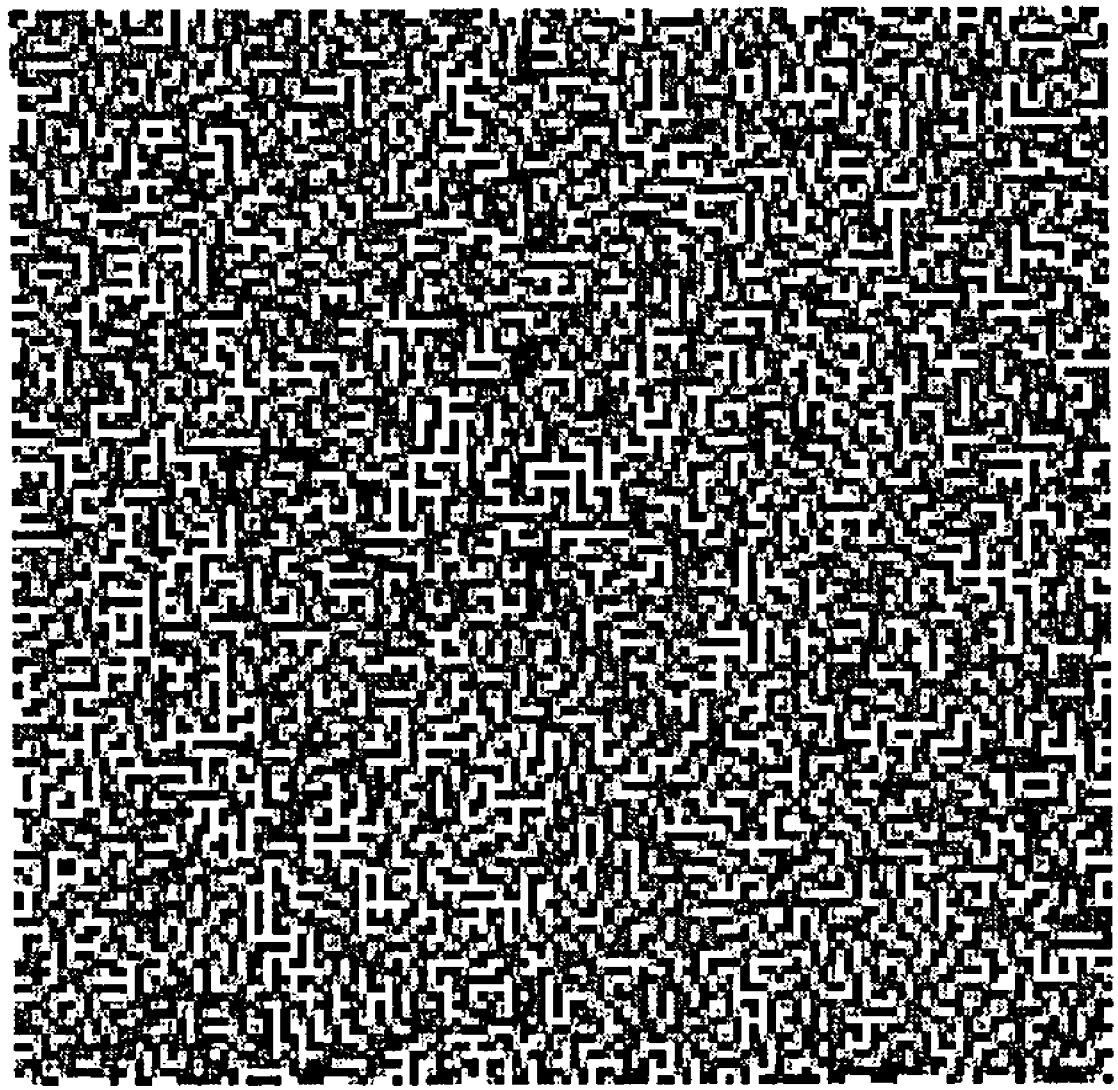
FIG. 2 shows a portion of (pseudo) random binary visual field generated using a dither matrix.

To generate a uniform visual field from a binary dither output for a fixed grayscale level, the grayscale level is chosen so that a sufficient minority of pixels in the dithered output intersect the foreground pixel regions of the text. Thus, thin text would need more minority pixels (hence a gray level closer to 50%), while thicker text could use lighter or darker grayscale levels. FIG. 2 shows a portion of a (pseudo) random binary visual field generated using a dither matrix.

Text information is displayed by presenting a periodic sequence of visual fields. The value of a pixel at a given location and time is determined by two quantities: (1) a flag or other indicator that indicates whether the pixel belongs to the text foreground or background region, and (2) the designation of two orbits (one for the foreground and one for the background) that determine the sequence of shifts given to the dither matrix prior to generating an element of the foreground or background. An orbit is defined as a sequence of vertical and horizontal shifts, described using displacement vectors, that determines which dither-matrix element should be accessed to compute the output at a given location. An example of a 4-element orbit is the sequence of displacements [(0,1), (1,1), (1,0), (0,0)]. The 4-element orbit [(0,1), (−1,1), (−1,0), (0,0)] is another example that describes an orbit in a sense that is opposite to the one given in the first example. These are merely two exemplary orbits that may be used in connection with this embodiment of the invention.

In this embodiment, foreground (text) and background regions are displayed using two different orbits. Referring again to the flow chart of FIG. 1, the sequence of steps in generating a secure display in accordance with this embodiment begins (assuming the input is already in binary form) by selecting a suitable gray level with sufficient minority dots as described above (step 101). Both foreground and background regions are rendered using this gray level (step 102). Next, two different orbits are chosen, typically with the same number of elements but opposite senses of rotation), one being for the foreground region and the other being for the background region (step 103).

The foreground and background regions are then processed using their respective orbits to determine respective circular shifted displacements of the dither matrix. Given the frame sequence number F and frame period N, the displacement to be used is given by the $(F \% N)^{th}$ element of the orbit corresponding to the associated foreground or background region. The dither matrix is circularly shifted by this corresponding displacement (steps 104 and 105), and the resulting threshold, i.e., corresponding matrix element, at each pixel location (foreground and background) is compared against the value of the selected grayscale level to compute the output value of each pixel (steps 106 and 107). In one arrangement, if the grayscale value is greater than (or greater than or equal to) the value of the corresponding matrix element, the grayscale value is output at that pixel location; otherwise, a contrasting color, e.g., white, is output at that location. Next, the pixels are rendered on a display in accordance with this computation, resulting in a secure text display (step 108).

Steps 104-108 are repeated for each frame.

Figure 3:
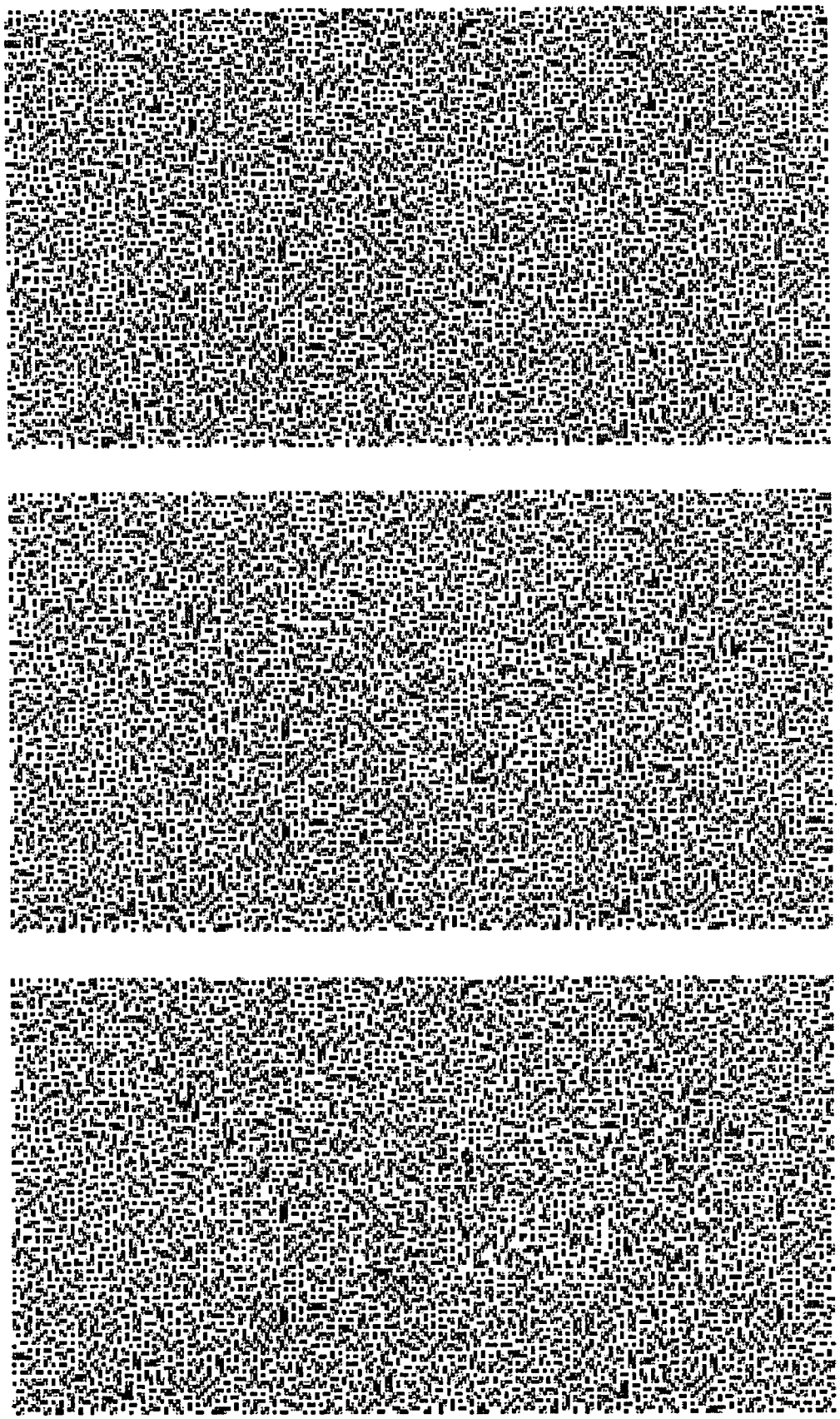
FIG. 3 shows three (3) successive frames from a frame sequence to show a text message.
Figure 4:
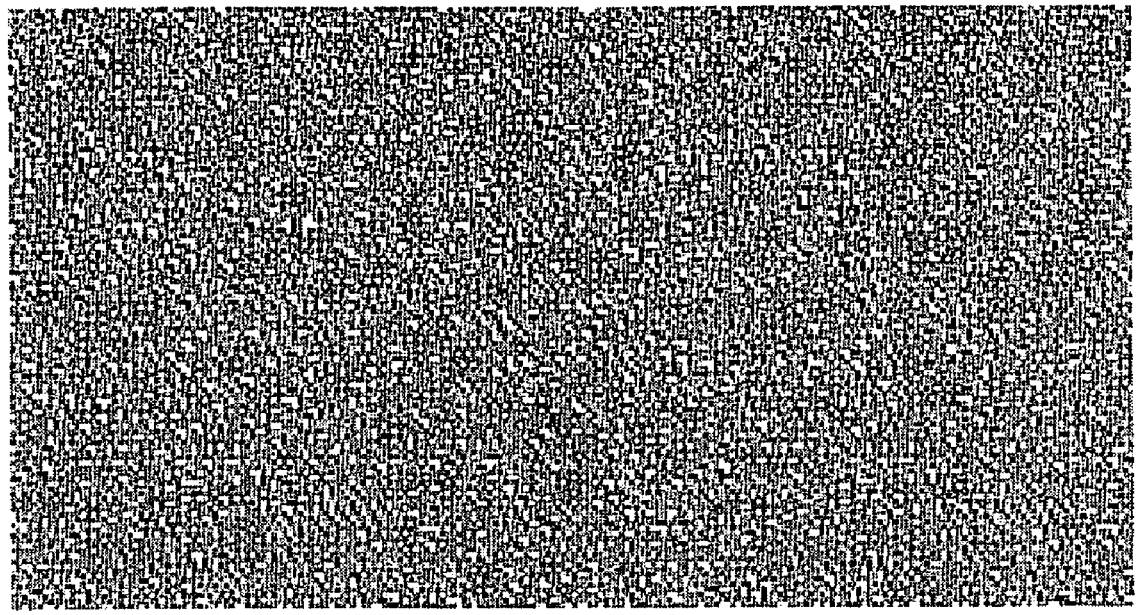
FIG. 4 shows a three-frame average of successively displayed frames.
Figure 5:
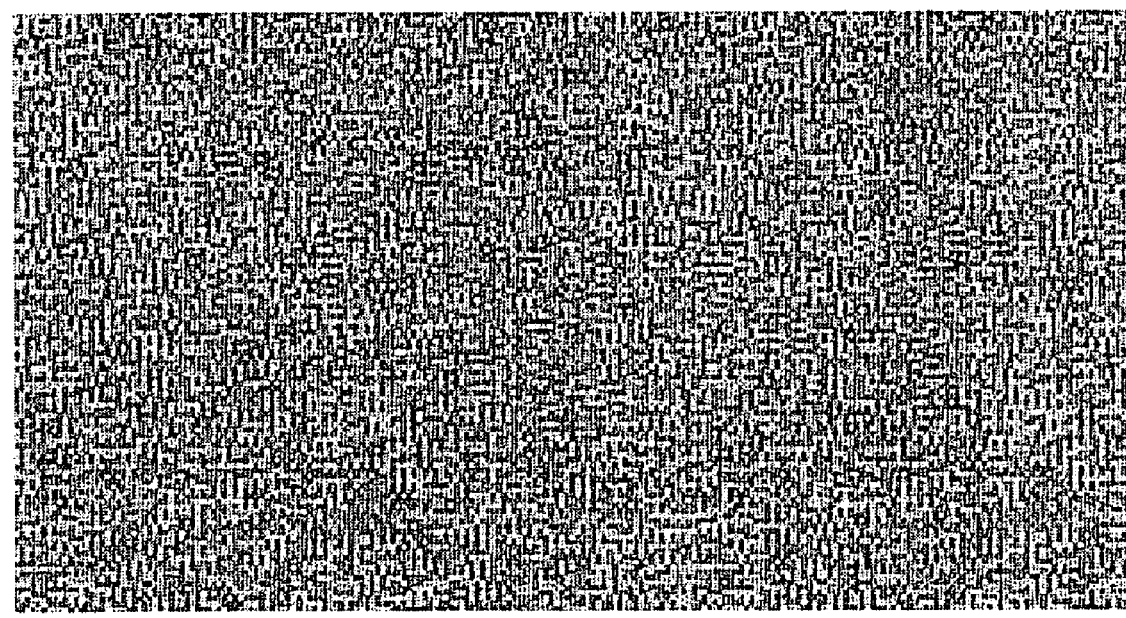
FIG. 5 shows a five-frame average of successively displayed frames.

FIG. 3 shows three frames from a frame sequence to generate a text output containing the word "Test," while FIGS. 4 and 5 show three- and five-frame averages of successively displayed frames, respectively.

Using Different Update Rates for Foreground and Background Pixels

An alternate way of generating a set of random fields from a dither matrix, such that the average of successive frames is a uniform shade of gray, is to partition the ranks in the dither matrix into N equal-sized bins, where N is the frame period. In this case, a particular index (i.e., the $n^{th}$ index) is selected for a given frame, and all of the matrix elements in the $n^{th}$ bin are set to the foreground color value, and the remaining matrix elements are set to the background color value. In this case, an orbit is defined as a sequence of bin indices instead of displacement vectors. Assignment of pixel colors proceeds in the same way as described in the previous embodiment, with the modified definition of orbit and technique for generating the output. Repeating an index consecutively has the effect of slowing down the rate of update for the given region.

Figure 1:
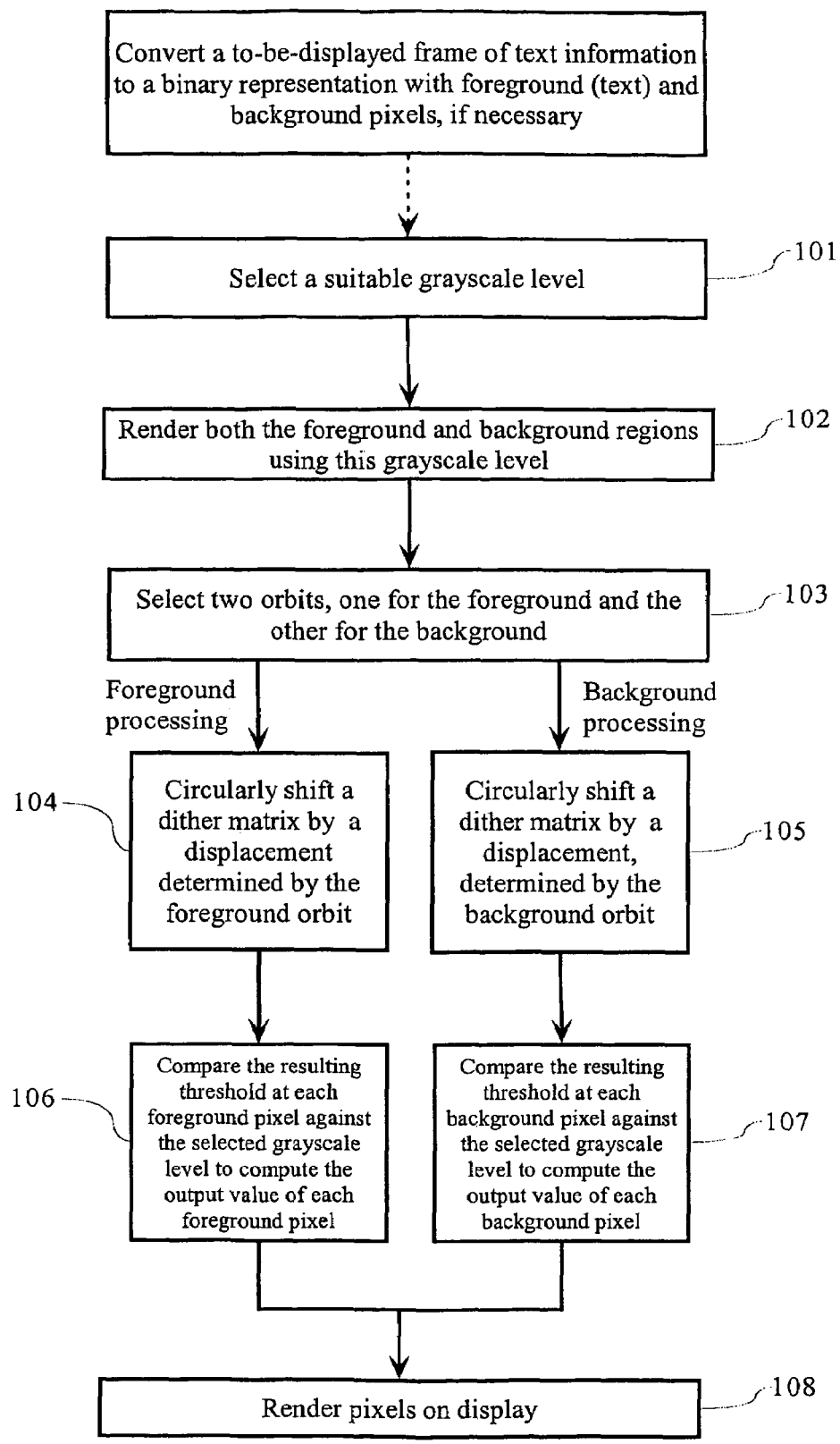
FIG. 1 is a flow chart illustrating the steps of generating a secure text display, according to an embodiment of the invention.
Figure 6:
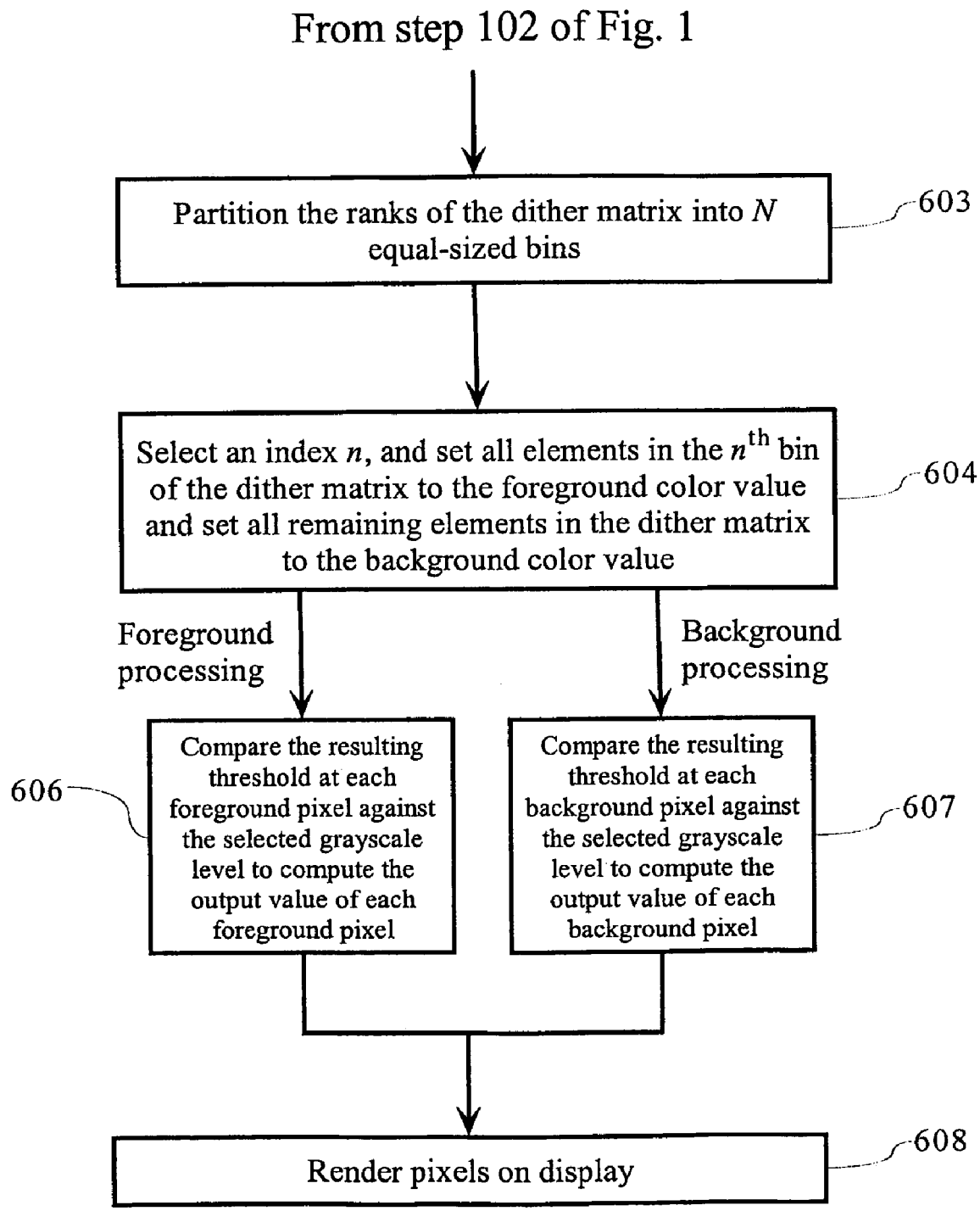
FIG. 6 is a flow chart illustrating the steps of generating a secure text display, according to another embodiment of the invention.

FIG. 6 illustrates the steps of this embodiment, which begins with the preprocessing step (if necessary) and steps 101 and 102, shown in FIG. 1. After both the foreground and the background regions are rendered using the selected grayscale level, the ranks of the dither matrix are partitioned into N equal-sized bins, N denoting the frame period (step 603). An index n corresponding to the $n^{th}$ bin is selected, and all elements in the $n^{th}$ bin of the dither matrix are set to the value of the foreground color, while the remaining elements in the dither matrix are set to the value of the background color (step 604). The comparison and output value computation operations are the same as described above. That is, in steps 606 and 607, the resulting threshold, i.e., corresponding matrix element, at each pixel location (foreground and background) is compared against the value of the selected grayscale level to compute the output value of each pixel. For example, if the grayscale value is greater than (or greater than or equal to) the value of the corresponding matrix element, the grayscale value is output at that pixel location; otherwise, a contrasting color, e.g., white, is output at that location. Next, the pixels are rendered on a display in accordance with this computation, resulting in a secure text display (step 608).

Effects

Figure 7:
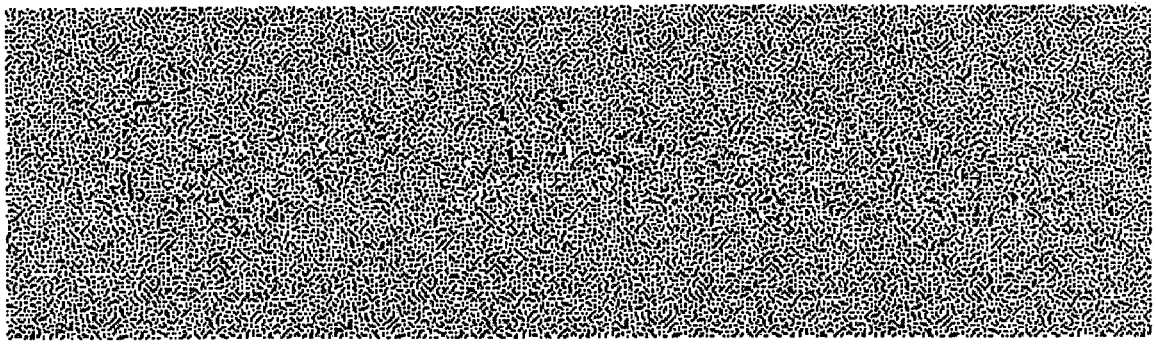
FIG. 7 shows an example of the Moiré created by sub-sampling a single image frame.
Figure 8:
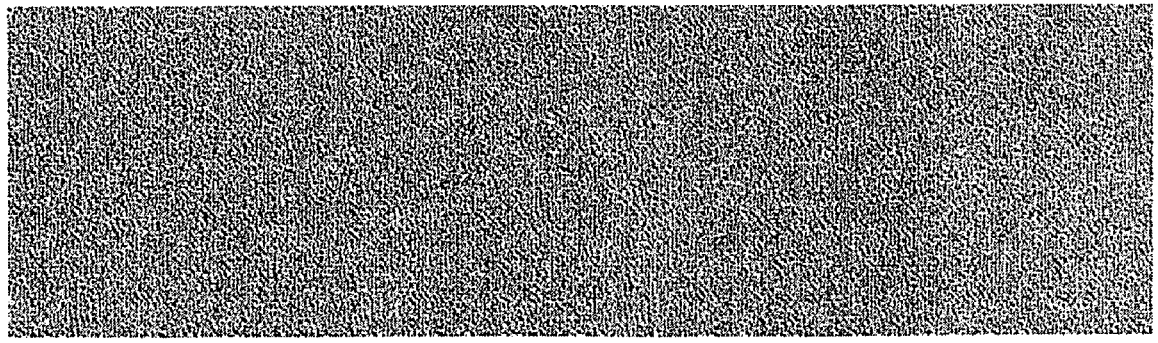
FIG. 8 shows an example of the Moiré created by sub-sampling three image frames.

Whether the same or different update rates are used for the background and foreground pixels, sampling the visual field with a combination of temporal and spatial filtering (by using a still or video camera) results in destruction of the displayed content due to the rapid loss of correlation and strong Moiré patterns created by the periodicities in the dither matrix. FIG. 7 shows an example of the Moiré created by sub-sampling a single image frame, and FIG. 8 shows an example of the Moiré created by sub-sampling three image frames. The nature of the display is such that it is hard to view the correlations required to see the text unless it is viewed within a narrow field of view within a short distance of the display.

Implementations and Applications

Having described embodiments of a secure text display and methods of generating the same, the discussion now turns to various systems in which the technology of this invention can be implemented. The applications envisioned for deployment of this technology are numerous. The technology may be embodied in any display device that employs an LCD panel, CRT screen or other display technology that can be refreshed at a rate of at least about 10 frames per second. Of these display devices, those that are often used in public places, e.g., hand-held, cell-phone and laptop displays, are the best candidates for this technology. In that context, the invention is very useful for enabling a user to read passwords or sensitive text in public places without disclosing such information to eavesdroppers.

Figure 9:
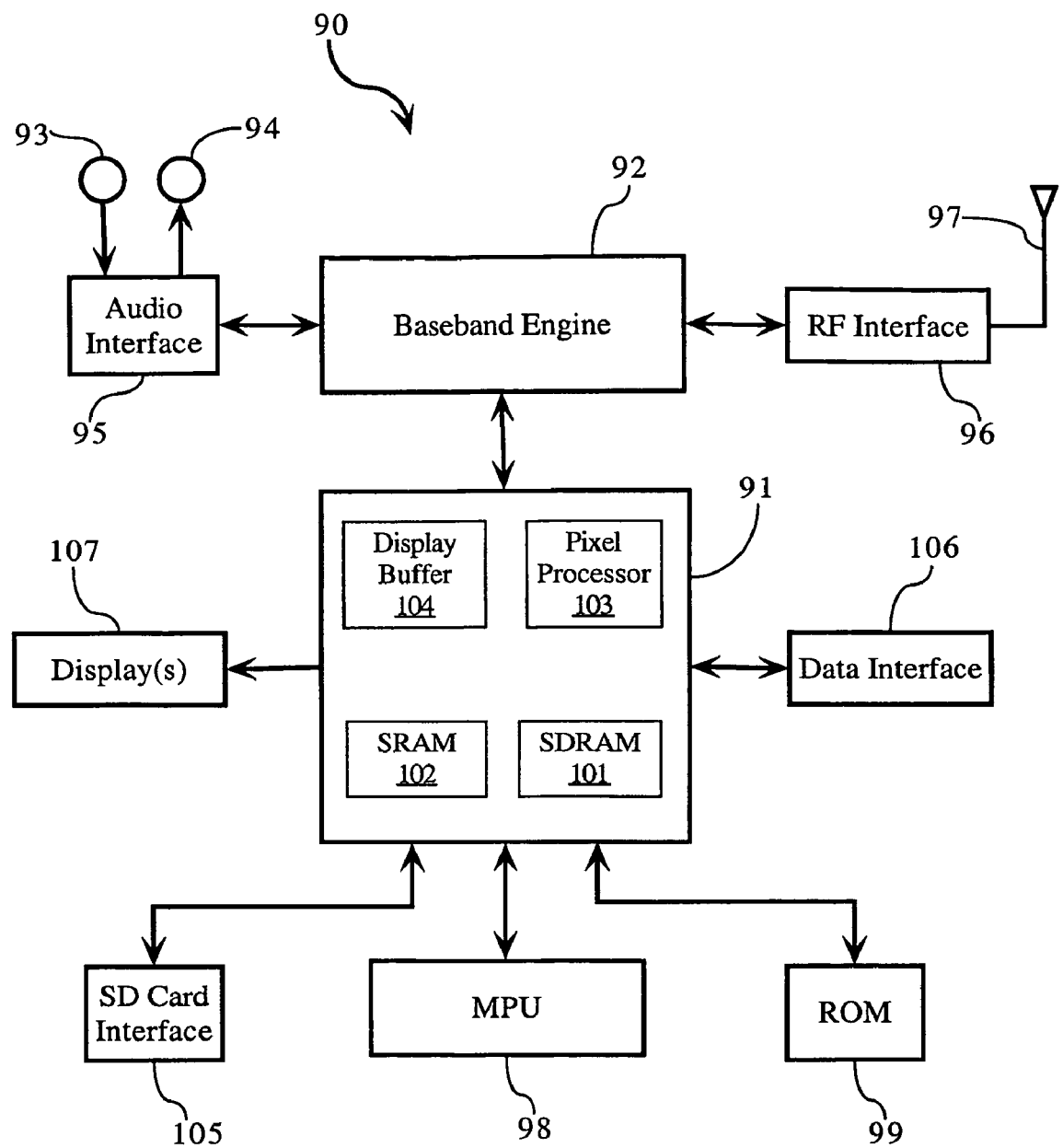
FIG. 9 is a block diagram of an exemplary hand-held device (e.g., a cell phone) to which the techniques of the invention can be applied.

FIG. 9 is a high level block diagram of a system 90, which can be embodied in a cell phone or other hand-held device, and which can be configured to generate a secure text display. Referring to FIG. 9, a mobile graphics engine (MGE) 91 is in bi-directional communication with a baseband engine 92 that processes incoming audio signals from a microphone 93 and outputs processed audio to a speaker 94 via an audio interface 95. Baseband engine 92 is also in bi-directional communication with an RF interface 96, through which processed audio, image, text, and other data is sent for wireless transmission through antenna 97 to external device(s). Data received through antenna 97 is also delivered to baseband engine 92 through the RF interface 96.

MGE 91 also communicates with a microprocessor unit (MPU) 98, which may be, for example, one of the Motorola 68000 (aka m68k) family of microprocessors. Non-volatile memory such as ROM 99, with which MGE 91 communicates, may be used to store the device's operating system and applications, which may include embodiments of programs that implement various aspects of the present invention. During operation, code is fetched from ROM 99 and executed. During execution of the code, SDRAM 101 and/or SRAM 102, embedded on MGE 91 or in communication therewith, stores intermediate data, register stacks, etc. SDRAM 101 also provides ample storage for image data received from external sources, including a camera (not shown), while SRAM 102 also provides high speed buffering for other MGE-embedded components, such as a pixel processor 103 and a display buffer 104.

In the illustrated embodiment, an SD interface 105 provides MGE 91 with access to an SD memory card. A data interface 106, which may be a USB or other suitable connection, enables the uploading/downloading of data (e.g., photos, images, etc.) to/from a computer or other device.

System 90 also includes a display 107, which may represent one or more physical displays. For example, on the exterior of the device in which system 90 is embodied there may a small secondary display for displaying the time, date, etc. and a larger main display for displaying images, photos, text, graphics, etc. The display (e.g., a main display) on which text can be securely rendered according to the invention is any type of display, e.g., LCD, CRT, etc., that can be refreshed at a rate of at least about 10 frames per second. Each display is controlled by MGE 91, which also functions as a display controller.

Within this environment or other environments suitable for carrying out the image frame processing described above, the processing of this invention may be conveniently specified in the form of software that controls the operation of the appropriately configured hardware. Alternatively, the processing instructions can be directly embodied in hardware, such as ASIC(s), digital signal processing circuitry, or the like to achieve the equivalent of such software-based instructions. As such, the claim language "device-readable medium" includes not only software-carrying media, but also hardware having instructions for performing the required processing hardwired thereon, as well as a combination of hardware and software. Similarly, the claim language "program of instructions" includes both software and instructions embedded on hardware. With these implementation alternatives in mind, it is to be understood that the figures and accompanying description provide the functional information one skilled in the art would require to write program code (i.e., software) or to fabricate circuits (i.e., hardware) to perform the processing required.

As will be appreciated from the foregoing, the present invention provides a display and method for operating a display such that (i) the picture of a single displayed frame, or an average of displayed frames, does not yield the secure content, thereby preventing the copying of the displayed content by still cameras; (ii) the displayed content is readable only within a narrow range of distances and viewing angles to prevent casual over-the-shoulder perusal of the content by an unintended human observer; and/or (iii) the displayed content is not recoverable by capturing the display using an ordinary video camera.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for securely rendering information on a display, the method comprising:

rendering a periodic sequence of frames with a frame period, each frame in the sequence of frames is given a frame sequence number; both a foreground region and a background region of each frame uses a selected grayscale level, and each frame comprising a plurality of pixels;

selecting a first orbit, consisting of multiple elements of a sequence of displacement vectors which is divisible by the frame period, for the foreground region and a second orbit, consisting of multiple elements of a sequence of displacement vectors which is divisible by the frame period for the background region; and determining the value of a particular pixel comprising the steps of:

choosing the particular pixel at a given location in a particular frame with a particular frame sequence number;

accessing a particular element of a dither matrix corresponding to the given location of the particular pixel displaced by an element of the sequence of displacement vectors of either, the first orbit if the particular pixel is in the background region, or the second orbit if the particular pixel is in the foreground region, wherein the element of the sequence of displacement vectors is given by the remainder of the particular frame sequence number divided by the frame period; and comparing the particular element with the selected grayscale level to compute the output value for the particular pixel.

2. The method as recited in claim 1, wherein the first and second orbits have the same number of displacement vectors and have opposite senses of rotation.

3. A device, comprising:

processing circuitry configured to render both a foreground region and a background region of a frame using a selected grayscale level, each of the foreground and background regions comprising a plurality of pixels;

build spatial and temporal correlations in a visual rendering of text in the foreground region using a dither matrix, such that if the text is sampled with a combination of temporal and spatial filtering the sampled text experiences a loss of correlation; and wherein building the spatial and temporal correlations comprises the following steps:

selecting a first orbit, consisting of a sequence of displacement vectors, for the foreground region and a second orbit, consisting of a sequence of displacement vectors, for the background region;

identifying a particular pixel as being a foreground pixel if it is in the foreground region or a background pixel if it is in the background region;

shifting the dither matrix by a first displacement vector determined by the first orbit if the particular pixel is identified as a foreground pixel; or shifting the dither matrix by a second displacement vector determined by the second orbit if the particular pixel is identified as a background pixel; and comparing an element that corresponds to the location of the particular pixel of the dither matrix that has been shifted to the selected grayscale level, to compute the output value for the particular pixel; and a display on which the frame is rendered.

4. The device as recited in claim 3, wherein the first and second orbits have the same number of displacement vectors and have opposite senses of rotation.

5. The device as recited in claim 3, wherein the first displacement is given by the (F % N frame sequence number F modulo frame period N)$^{th}$ element of the first orbit, and the second displacement is given by the (F % N)$^{th}$ element of the second orbit.

6. The device as recited in claim 3, wherein the processing circuitry includes at least one of a mobile graphics engine, a display controller, or a microprocessor unit.

7. The device as recited in claim 3, wherein the processing circuitry includes the mobile graphics engine, the mobile graphics engine including a pixel processor.

8. The device as recited in claim 3, wherein the device is a hand-held device.

* * * * *